(12) United States Patent
Hust et al.

(10) Patent No.: US 11,584,686 B2
(45) Date of Patent: Feb. 21, 2023

(54) METHOD FOR ENGINEERED CELLULAR MAGMATIC MESOPOROUS COMPOUNDS AND ARTICLES THEREOF

(71) Applicant: GlassWRX, LLC, Beaufort, SC (US)

(72) Inventors: Robert Michael Hust, Coeur d'Alene, ID (US); Gert Nielsen, Albuquerque, NM (US); William Gene Ramsey, Warrenville, SC (US); Philip Galland, Spokane, WA (US)

(73) Assignee: GlassWRX, LLC, Beaufort, SC (US)

( * ) Notice: Subject to any disclaimer, the term of this patent is extended or adjusted under 35 U.S.C. 154(b) by 0 days.

(21) Appl. No.: 17/481,137

(22) Filed: Sep. 21, 2021

(65) Prior Publication Data

US 2022/0089476 A1  Mar. 24, 2022

Related U.S. Application Data

(60) Provisional application No. 63/082,468, filed on Sep. 23, 2020, provisional application No. 63/082,462, filed on Sep. 23, 2020.

(51) Int. Cl.

| | |
|---|---|
| *C03C 10/00* | (2006.01) |
| *C03C 23/00* | (2006.01) |
| *C03C 11/00* | (2006.01) |
| *C01B 39/02* | (2006.01) |
| *C03C 14/00* | (2006.01) |
| *C01B 33/26* | (2006.01) |

(52) U.S. Cl.
CPC .......... *C03C 23/0095* (2013.01); *C01B 39/02* (2013.01); *C03C 10/00* (2013.01); *C03C 11/007* (2013.01); *C03C 14/004* (2013.01); *C01B 33/28* (2013.01); *C03C 2203/00* (2013.01); *C03C 2214/20* (2013.01); *Y10T 428/249953* (2015.04)

(58) Field of Classification Search
CPC ..... C01B 39/02; C03C 23/0095; C03C 10/00; C03C 11/007; C03C 14/004; C03C 2203/00; C03C 2214/20; C03C 2214/30
See application file for complete search history.

(56) References Cited

U.S. PATENT DOCUMENTS

| | | | |
|---|---|---|---|
| 4,404,291 A | | 9/1983 | Kiefer et al. |
| 5,716,899 A | * | 2/1998 | Guile ................. B01J 20/28069 502/514 |
| 2005/0074397 A1 | | 4/2005 | Pinnavaia et al. |
| 2009/0162414 A1 | | 6/2009 | Hing et al. |
| 2019/0256429 A1 | | 8/2019 | Hust |

FOREIGN PATENT DOCUMENTS

| | | |
|---|---|---|
| EP | 0180200 A2 | 5/1986 |
| WO | WO2021156571 A1 | 8/2021 |

OTHER PUBLICATIONS

The International Search Report and Written Opinion for PCT Application No. PCT/US21/51568, dated Jan. 26, 2022, 8 pages.

* cited by examiner

*Primary Examiner* — Noah S Wiese

(74) *Attorney, Agent, or Firm* — Lee & Hayes, P.C.

(57) ABSTRACT

Methods for engineered mesoporous cellular magmatics and articles thereof are disclosed. For example, the magmatics may include a mixture of substance that, when exposed to heat for a length of time, form a foamed mass. The foamed mass may be exposed to a solution configured to cause mineralization upon and within the articles.

20 Claims, 8 Drawing Sheets

500

```
┌─────────────────────────────────────────────────────────────────────────────┐
│ Create mixture of: pulverized or powdered glass; pulverized or powdered     │
│ blowing agent; and vitreous material having melting temperature higher      │
│ than pulverized or powdered glass and pulverized or powdered blowing agent  │
│                                    502                                      │
└─────────────────────────────────────────────────────────────────────────────┘
                                      │
                                      ▼
┌─────────────────────────────────────────────────────────────────────────────┐
│ Apply heat to mixture at first temperature and for first dwell time until:  │
│ at least portion of mixture sinters; at least portion of pulverized or      │
│ powdered glass foams to form foamed mass; at least portion of the           │
│ pulverized or powdered blowing agent decomposes; and vitreous material is   │
│ enclosed by pores of foamed mass                                            │
│                                    504                                      │
└─────────────────────────────────────────────────────────────────────────────┘
                                      │
                                      ▼
┌─────────────────────────────────────────────────────────────────────────────┐
│     Apply a solution configured to cause the synthesis of zeolites          │
│                         upon the foamed mass                                │
│                                    506                                      │
└─────────────────────────────────────────────────────────────────────────────┘
```

Create mixture of: pulverized or powdered glass; pulverized or powdered blowing agent; vitreous material having melting temperature higher than pulverized or powdered glass and pulverized or powdered blowing agent; and a non-sintering mesoporous agent
702

Apply heat to mixture at first temperature and for first dwell time until: at least portion of mixture sinters; at least portion of pulverized or powdered glass foams to form foamed mass; at least portion of the blowing agent decomposes; and vitreous material is enclosed by pores of foamed mass
704

Apply a solution containing a binder and/or mesoporous material upon the foamed mass
706

FIG. 7

METHOD FOR ENGINEERED CELLULAR MAGMATIC MESOPOROUS COMPOUNDS AND ARTICLES THEREOF

RELATED APPLICATIONS

This application claims priority to U.S. Provisional Patent Application No. 63/082,462, filed on Sep. 23, 2020 and U.S. Provisional Patent Application No. 63/082,468, filed on Sep. 23, 2020, the entire contents of which are incorporated herein by reference.

BACKGROUND

The production of glass and/or ceramic aggregates may be beneficial in multiple use cases. Such aggregates have uniform structures and/or properties. Described herein are improvements and technological advances that, among other things, generate alternatives to conventional foamed glass.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the components on a larger scale or differently shaped for the sake of clarity.

FIG. 5 is a flowchart illustrating an example process for generating mesoporous cellular magmatics.

FIG. 7 is a flowchart illustrating an example process for generating mesoporous cellular magmatics.

DETAILED DESCRIPTION

Figure 1A:
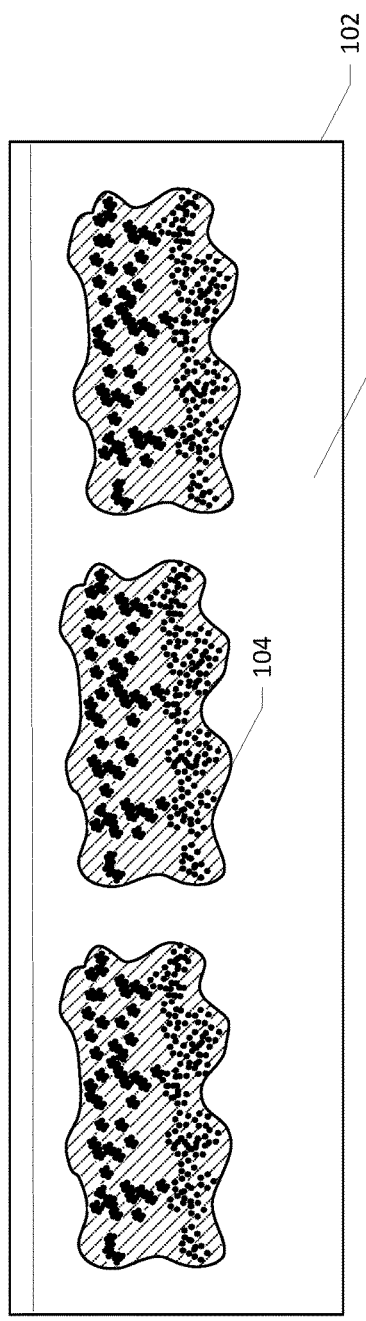
FIG. 1A illustrates an example mesoporous cellular magmatic being introduced to a solution bath.

Methods for engineered mesoporous cellular magmatics and articles thereof are disclosed. Take, for example, situations where silicate aggregates are to be made. Silicate aggregates, otherwise described herein as foam glass and/or ceramic aggregates, may be utilized for a number of purposes, such as insulation, remediation of waste, filler material, a component of concrete or other hardscape, and/or one or more other uses. Generally, silicate aggregates may be composed of a precursor material such as a glass-grade silica powder, ground glass, and/or silica-lime glass, for example. However, conventional silicate aggregates have a single composition, have homogenous and/or uniform properties, have a single density, have a single porosity, and/or are either open-celled or close-celled. Additionally, unlike the inert or nearly inert conventional silicate aggregates, the mesoporous magmatics described herein may include one or more reactive agents that are predetermined to interact with one or more substances when those substances contact the reactive agents. Furthermore, unlike conventional silicate aggregates, the magmatics described herein may include vitreous materials contained at least partially within pores of the magmatics and leading to regions of the magmatics that are mesoporous and/or nanoporous.

Engineered mesoporous cellular magmatics may be engineered cellular magmatics as described herein but with reactive and/or non-reactive bodies that are enclosed and/or fused within the cells of the structure. This may lead to greatly increasing the reactive surface area of the material while establishing pore structures and/or vesicular corridors that contain openings ranging from two nanometers to one millimeter. To do so, vitreous materials, also referred to herein as infiltration materials, may be added to the precursor materials and/or may be added following formation of a foamed mass. Infiltration material describes any material that is configured to resist becoming a constituent of the pyroplastic mass forming the cell wall either because it has a higher softening and/or melting temperature, and/or because the surface chemistry of the infiltration material is resistant to incorporation into the cell wall mass, and/or because the surface chemistry incorporates a blowing agent that decomposes at a lengthier dwell time or at a higher peak in temperature, causing the material to infiltrate and remain within a cell that has resulted from the expansion of the blowing agent or agents.

The vitreous materials may include at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, pyrolysis ash, Sodium Nitrate, Sodium Sulphate, Sodium Silica-fluoride, and/or Zinc Oxide, for example. Furthermore, the vitreous material inputs may include, but are in no way limited to one or more glasses characterized as soda-lime glass, flint, container glass, a-glass, flat glass, e-glass, c-glass, ar-glass, s-glass, niobophosphate glass, single phase borosilicate glass, phase separated borosilicate, fused silica, coal slags, metal slags, smelting slags, mineral wool—these materials should not be construed as limiting the invention of this disclosure but should serve instead to illustrate a broad range of and classes of acceptable materials. Selection of the infiltration material (s) for a given application may be based at least in part on the desired characteristics, including surface chemistry of the infiltration material particles, whether the infiltration materials are to be fixed or floating in cells of the foamed mass, and the desired porosity of the resulting foamed mass.

During formation of the mesoporous cellular magmatic, heat is applied as described herein to cause a foamed mass to form. The foamed mass may include one or more pores and/or cells, which may be closed cell and/or open cell. The infiltration material may aggregate in the void of the cells and bind with the cell wall and/or not bind with the cell wall such that the infiltration material "floats" or is otherwise not affixed to the cell wall. By so doing, mesoporous and/or nanoporous regions between individual infiltration material components may be formed.

The formation of a mesoporous cellular magmatic may be achieved in one of multiple ways. For example, one or more of the precursor materials, including the silicate material, the blowing agent, the infiltration material, and/or one or more other materials such as a reactive agent may be sufficiently pulverized such that the particle size of one or more of these materials is in the micrometer and/or nanometer size range. When the vitreous material is pulverized to this size range, the space between particles when enclosed in the foamed mass may be in the mesoporous and/or nanoporous size range. Additionally, or alternatively, the vitreous material may be added to the foamed mass after formation. When the vitreous material is sufficiently small and the foamed mass includes at least some open cells, the vitreous material may filter in through vesicular corridors and become entrapped therein. Additionally, or alternatively, the vitreous material may be applied as a coating to the foamed mass. The coating may adhere to the exterior of the foamed mass and may cause that exterior of the foamed mass to have mesoporous and/or nanoporous regions. Additionally, or alternatively, the foamed mass may be at least partially mineralized. The act of mineralization may cause the infiltration materials, and/or other materials of the foamed mass, to reduce in size and/or become more compact, leading to mesoporous and/or nanoporous regions.

In examples, the magmatics described herein may also be configured to bind a crystalline phase into an overall amorphous structure while making the crystalline phase available for interaction with other substances. In the scope of this document amorphous is defined as a bulk material or phase that consists of a non-crystalline structure which is also a non-equilibrium material. In examples, the crystalline phases are batch chemical phases (high refractory ceramic species) and/or crystalline phases derived from a phase change or chemical reaction with other crystalline or glassy components. Further, secondary species can be derived during firing or upon specific chemical treatment postproduction—imbuing an article that is predominately amorphous with a crystalline fraction.

The magmatics may also have closed cell structures and/or open cell structures. For example, a closed cell structure may comprise, in either the amorphous or crystalline phases, an open space that is not connected to other open spaces. By way of example, the magmatic may have open spherical voids in the amorphous and/or crystalline phases. When those spherical voids are not connected to other spherical voids, the voids may be closed cell. When those spherical voids are connected to other spherical voids, the voids may be open cell. The cells may be of uniform or about uniform size throughout the magmatic structure, or some or all of the cells may differ in size. Additionally, while spherical voids are described herein by way of example, various other shapes of voids may be generated. In some examples, the crystalline phase may not be associated with or otherwise contact the open and/or closed cell structures. In other examples, the crystalline phase may make up at least a portion of the wall of at least one cell structure (whether closed or open celled) in the magmatic. In addition to the above, the magmatic may include one or more non-vesicular pores, which may be described as tunnels or otherwise tubes that run through at least a portion of the magmatic.

In addition to the above, one or more reactive agents may be applied to the magmatic to imbue one or more portions of the magmatic with reactive properties. For example, the reactive agents may be selected during manufacture of the magmatics and may be disposed on certain portions of the resulting magmatic. By way of example, reactive agents may be disposed on one or more cell walls of a closed and/or open cell void in the magmatic. In some examples, a reactive crystalline agent may be disposed on a first portion of the magmatic while a reactive amorphous agent may be disposed on a second portion of the magmatic. Additionally, one or more reactive agents may be disposed on an exterior portion of the magmatic, such as when a postproduction imbuing is utilized. In these examples, the exterior reactive agent may be the same or different from the reactive agent disposed within the magmatic. Additionally, the exterior reactive agent may penetrate at least a portion of the magmatic, and in some examples may penetrate one or more of the cell structures of the magmatic. It should be understood that in some examples the infiltration materials may be the reactive materials, particularly when the infiltration materials are reactive compounds. In other examples, the infiltration materials may be separate and distinct from the reactive materials.

Furthermore, the magmatics described herein may include one or more layers. For example, during manufacturing of the magmatics, specific temperatures, dwell times, and/or heating gradients may be applied to cause at least a portion of a infiltration materials to form a different chemical substance and/or enter a different state than the original infiltration materials. In these examples, the original infiltration material and the different chemical substance and/or state may at least partially separate into one or more layers in the magmatic. In still other examples, multiple infiltration materials may be selected and one layer of the magmatic may have a first infiltration material (and/or may predominantly include the first infiltration material) while another layer of the magmatic may have a second infiltration material (and/or may predominantly include the second infiltration material). By so doing, a first layer of the magmatic may include first properties when one or more substances contact the first layer, and specifically the infiltration materials of the first layer, while a second layer of the magmatic may include second, different reactive properties when one or more substances contact the second layer, and specifically the infiltration materials of the second layer. In some examples, the porosity of the multiple layers may differ. In these examples, some substances that contact the first layer may be sequestered or more sequestered than when the substances contact a second layer. By so doing, a single magmatic may exhibit nanoporous, mesoporous, and/or microporous portions and may act to sequester and/or react with multiple different substances that contact the magmatic.

Also disclosed herein are methods for generating mesoporous cellular magmatics. The methods may include creating a mixture of at least pulverized and/or powdered glass and pulverized and/or powdered blowing agent. The glass and/or blowing agent may be pulverized and/or powdered to a unit size specific to the application at issue and for the desired resulting magmatic. In examples, the grain size of the glass and/or blowing agent components may be smaller, sometimes significantly smaller, than the intended voids to be generated in the resulting magmatic. The glass component may include, for example, one or more of soda-lime glass, flint, container glass, a-glass, flat glass, e-glass, c-glass, ar-glass, s-glass, single phase borosilicate glass, phase separated borosilicate, fused silica, coal slags, metal slags, nickel slag, smelting slags, mineral wool, iron phosphates, aluminoborosilicates, vanadium oxides, and/or boron. It should be understood that these glass materials are provided by way of illustration, and not as a limitation. The blowing agents may include one or more of aluminum slag, anthracite, activated carbon, calcium carbonate, calcium sulfate, carbon black, cellulose, coal, fly ash, graphite, magnesium carbonate, potassium nitrate, silicon carbide, silicon nitride, sodium hydroxide, sodium nitrate, sodium nitrite, and/or zinc oxide. Again, it should be understood that these glass materials are provided by way of illustration, and not as a limitation.

The mixture may also include one or more reactive agents. The reactive agents may include, for example, alumina, bauxite, sodium aluminate, periclase, hematite, wüstite, magnetite, enamel, zircon, zirconium dioxide, silicon carbide, silicon nitride, garnet, spinel, kaolin, clays, zeolites, incinerator ash, and/or pyrolysis ash. Again, it should be understood that these reactive agents are provided by way of illustration, and not as a limitation.

The mixture may also include one or more of the vitreous materials as described herein. The vitreous materials may be non-sintering infiltration agents where an agent's individual grain or fiber cross sections are significantly larger than the grain size of the first glass or vitreous material but less than one half the diameter of the intended cell size that will result from the decomposition of the blowing agent. Optionally or in combination with the aforementioned materials, a blowing agent may be provided that is a pulverized and/or powdered non-sintering material having been previously surface treated with a blowing agent such that the agent has been deposited on the surface of the pulverized non-sintering material. It should be noted that a non-sintering material may be a material that is non-sintering relative to the thermal profile used to create the specific species of engineered cellular magmatic being produced, for example it may be of a glass species that resists sintering at lower temperatures, but sinters readily at very higher temperatures.

The resulting mixture may be placed into a kiln or other heating component and a temperature may be applied until at least a portion of the blowing agent decomposes into a gas or gases, forming a distribution of cellular voids within the resulting foamaceous mass. In situations where a reactive agent is included in the mixture, application of heat in the kiln may be performed until, in examples, the reactive agent comprises a significant fraction of the surface area of the foamaceous mass and/or until the reactive agent comprises a residue on surfaces of the foamaceous mass. In examples, application of heat may be performed until, for example, the materials sinter and at least a portion of the mixture foams by thermal decomposition of the blowing agent and/or agents. The vitreous materials, having a higher melting point than the blowing agent and/or glass components may not sinter and may be enclosed in cells of the foamed mass as floating components and/or fixed components.

The temperature and dwell times may then be regulated such that at least a fraction of the cells of the foamaceous mass become interconnected by discontinuities in the cell walls. This discontinuity may be caused at least in part by pressure from escaping gases and/or constituent secondary blowing agents having a higher decomposition temperature than other blowing agents. The temperatures, dwell times, and heating gradients used with respect to the kiln may be adjusted to achieve a desired resulting magmatic. For example, adjusting one or more of the temperature, the dwell times, and/or the heating gradients may result in magmatics with differing cell size, porosity, open versus closed cells, inclusion or exclusion of non-vesicular pores, inclusion or exclusion of reactive agents on cell walls and/or other portions of the magmatic, inclusion or exclusion of vitreous materials in cells and/or as fixed components of cell walls, differing densities, inclusion of more or less crystalline phase, inclusion or exclusion of layers, inclusion or exclusion of reactive agent derivatives, inclusion or exclusion of vitreous material derivatives, etc.

The magmatics described herein may include a rigid foamed mass, typified by an appearance akin to pumice or volcanic rock, that is manufactured in an artificial elevated temperature environment. Such articles may exhibit both open or closed-cell structures, as well as open and closed-cell structures in the same article. These articles may also exhibit pore structure comprised of interconnected cells where cell walls have collapsed to form subsequent vesicular corridors, or pore structures without creating discontinuities in cells, or a combination of these aspects. Engineered cellular magmatics (ECM) differ from foam glass in that they are comprised of vitreous and crystalline batch components. In examples, silica acts primarily as the key glass forming species within the glassy phase and governs the viscoelastic properties of the ECM within a given environment. ECMs are formulated to perform specific tasks and react beneficially in specific environments and applications to produce directed outcomes—unlike foam glass, which strives to be inert. ECMs differ, in general, from ceramic foams as well in that they require less heat to produce, and yet have the ability to agglomerate multiple silica, clay, and mineral constituents into stable cellular structures. ECMs additionally are designed such that they consists of largely glass character and are intended to end in a mixing of crystalline and glass phases.

Furthermore, the magmatics described herein may include one or more zeolite materials. For example, once an ECM is formed, it may be allowed to come in contact with a solution that causes zeolite formation and/or growth (e.g., synthesis of zeolites) and/or mineralization. In some cases, the solution may be absorbed by the ECM. In some examples, an ECM exiting the kiln may then be made to come in contact with a zeolite forming solution or other mineralization solution which may include one or more of a solution containing alkali aluminates, alkali/alkaline hydroxides, alkali carbonates, water glass, sodium metasilicate, and/or tetramethylammonium hydroxide. In some cases, the solution (e.g., the zeolite forming and/or mineralization solution solution) may be sprayed onto the ECM via emitters that deposit the solution in the form of a mist and/or spray. In other cases, the ECM may be introduced to the solution via a solution bath where the ECM is immersed in a bath of zeolite inciting solutions and/or mineralization solution/, such that zeolites begin to form in the ECM. As the ECM is exposed to the solution (e.g., via the emitters and/or via the bath) over a period of time (e.g., 30 seconds, 5 minutes, 10 min, hours, days, etc.), formation of zeolites within the porous vesicular structure of the ECM may be formed and subsequently impart mesoporous properties and may increase the surface area and ion exchange benefits of the ECM.

Furthermore, the magmatics described herein may include one or more binders and/or mesoporous materials. For example, once an ECM is formed, it may be allowed to come in contact with a solution containing the binder and/or the mesoporous material that causes the binder and/or the mesoporous material to be incorporated into the ECM. In some cases, the solution may be absorbed by the ECM. In some examples, an ECM exiting the kiln may then be made to come in contact with a solution containing one or more binders and/or mesoporous materials which may include sodium metasilicate, lignosulfate, epoxy, ceramic slurry, clay slurry, cementitious slurry, plaster, mortar, starch, sugar, syrup, molasses, acrylic paint, enamel paint, biochar, pyrolysis ash, activated carbon, carbon nano-powder, zeolite(s), aluminosilicate, propylcarboxylic acid functionalized silica, and/or silica nanoparticles. In some cases, the solution (e.g., the binder and/or the mesoporous material solution) may be sprayed onto the ECM via emitters that deposit the solution in the form of a mist and/or spray. In other cases, the ECM may be introduced to the solution via a solution bath (e.g., a slurry solution, liquid solution, etc.) where the ECM is immersed in a bath of solutions, such that the binder and/or the mesoporous material begin to form in the ECM. As the ECM is exposed to the solution (e.g., via the emitters and/or via the bath) over a period of time (e.g., 30 seconds, 5 minutes, 10 min, etc.), formation of the binder and/or the mesoporous material within the porous vesicular structure of the ECM may impart mesoporous properties and may increase the surface area and ion exchange benefits of the ECM. In some cases, after the solution has been applied to the ECM, the ECM may be passed under another kiln (e.g., secondary kiln) configured to dry the ECM subsequent to the ECM being introduced to the solution. In some examples, subsequent to the ECM being introduced to the solution and the ECM drying, the ECM may be referred to as an ECM agglomerate.

Systems to generate the mesoporous magmatics described herein may include, for example, a conveyor element such as a conveyor belt configured to move the starting materials into a kiln and move produced engineered cellular magmatics from the kiln to a holding container. The system may also include a material dispenser that may be configured to hold constituent materials. The material dispenser may be positioned at a point before the kiln such that as materials exit the material dispenser and land on the conveyor element, the conveyor element may convey the materials into the kiln. The material dispenser may be substantially adjacent to the kiln and may have an opening on an end of the material dispenser proximal to the conveyor element. The opening may allow the constituent materials to flow from the material dispenser onto the conveyor element. The opening may be adjustable such that more or less constituent material is allowed to flow from the material dispenser to the conveyor element, either continuously or in batches. The system may additionally include one or more kilns.

The kiln may be configured to allow a portion of the conveyor element to pass through at least a portion of the kiln such that the constituent materials may enter an interior portion of the kiln, and engineered cellular magmatic products may exit the kiln. For example, the kiln may have a channel configured to receive a portion of the conveyor element, with a first end of the kiln configured to receive the constituent materials via the conveyor element and a second end of the kiln, opposite the first end, configured to output a product from the kiln. The kiln may be configured to apply heat to the constituent material as it travels through the kiln. In examples, the amount of heat applied by the kiln to the constituent materials may be adjustable. For example, the kiln can be divided into zones, with each zone having an adjustable temperature, such that a variety of temperatures and dwell times may be applied to the material. For example, the temperature in various zones of the kiln may be set to between about 400° Celsius and about 1,400° Celsius, such that the appropriate working or sintering temperature of constituent materials might be reached, as well as reaching the thermal decomposition temperature of other constituent materials. For example, a temperature of the kiln may be adjusted to be the at a first temperature about 25% of the way through the kiln, and then set to a higher temperature 50% of the way through the kiln such that the materials reach a working point and/or sintering temperature thermal and where thermal decomposition could occur in the blowing agent, and then a third temperature might be established 75% of the way through the kiln such that the now foamaceous mass may be allowed to temper, and not significantly fracture upon cooling after it leaves the kiln. Thereafter, the temperature may also vary depending on the speed at which the conveyor element is moving though the kiln as well. In examples, the time between when the constituent materials enter the kiln and when an engineered cellular magmatic product exits the kiln may be between about 30 minutes and about 90 minutes.

When a material dispenser is used, it may be caused to release the mixture onto the conveyor element such that a layer and/or piles of the material, and or bands of the material are formed on the conveyor element. It should be understood that while a blowing agent and a constituent glass material are utilized herein by way of example, the process may include more than one blowing agent and more than one other constituent material or may be followed by additional processing steps not specified here. A fundamental cellular magmatic may include at least one blowing agent, and at least one material capable of being sintered into a foamaceous mass in the presence of a blowing agent. Said material need not be glass in a strict sense, but should, under temperature, and in concert with either a blowing agent or additional constituent material, produce a crystalline phase within the magmatic, subordinate to the amorphous properties generated and/or imbued by the vitreous components. The product exiting the kiln may be compacted and/or fractured (either naturally or by applying force). The fractured product may be collected and may be utilized for one or more purposes as described herein.

The systems may also include one or more computing components that may be utilized to control the operation of the various components of the systems. For example, the computing components may include one or more processors, one or more network interfaces, and/or memory storing instructions that, when executed, cause the one or more processors to perform operations associated with the manufacture of engineered cellular magmatics. For example, the operations may include controlling the speed at which the conveyor element moves, the volume of constituent material that exits one or more of the material dispensers, an amount of constituent material added to the dispensers for each batch, a time at which the dispensers start and/or stop allowing constituent materials to travel from the dispensers to the conveyor element, a temperature and/or temperature gradient at which to set the kiln and/or specific zones within the kiln, and/or when to enable and/or disable one or more components of the systems. The computing components may include one or more input mechanisms such as a keyboard, mouse, touchscreen, etc. to allow a user of the system to physically provide input to the computing components to control the engineered cellular magmatic manufacturing systems.

Utilizing the systems and methods described herein, the resulting mesoporous magmatics may be utilized for several purposes, such as such as insulation, geotechnical fill, the capture of pollutants, a cleaning agent, an abrasive, geotechnical fill, a component of cementitious materials, a component of an agglomerate, a media for filtration, a media for remediation, a media for catalytic conversion, a support media for biological species, a vehicle for nutrient materials, a media for enhancing rhizospheres, or other purposes requiring macroporous and/or mesoporous structures that either react with a target environment, balance a target environment, or a non-reactive in a target environment, by design. Generally, engineered cellular magmatics may be predominately composed of one or more constituent materials such as powdered, pulverized, and/or milled silica, and/or silica sand and/or rhyolite, and/or felsic basalt, and/or, glass, and/or recycled glass, for example.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details of these and other examples are described below with reference to the drawings.

FIG. 1A illustrates an example solution bath 102 containing one or more mesoporous cellular magmatic(s) 104. The magmatic 104 of FIG. 1A is shown as an amorphous structure with no straight exterior portions. However, it should be appreciated that the exterior shape of the magmatic 104 may differ from that shown specifically in FIG. 1A.

In some examples, the solution bath 102 may contain a solution 106 that may cause zeolite formation and/or growth. For example, the solution 102 may be absorbed by the magmatic 104. In some examples, the magmatic 104 may exit a kiln and may then be made to come in contact with the solution 106 by being placed in the solution bath 102, which may contain alkali aluminates, alkali/alkaline hydroxides, alkali carbonates, water glass, and/or tetramethylammonium hydroxide. As the magmatic 104 is exposed to the solution 106 over a period of time (e.g., 30 seconds, 5 minutes, 10 min, etc.), formation of zeolites within the porous vesicular structure of the magmatic 104 may impart mesoporous properties and may increase the surface area and ion exchange benefits of the magmatic 104.

In some examples, the solution bath 102 may contain a solution 106 that may cause formation and/or growth of a foamed mass agglomerate. For example, the solution 102 may be absorbed by the magmatic 104. In some examples, the magmatic 104 may exit a kiln and may then be made to come in contact with the solution 106 by being placed in the solution bath 102, which may contain one or more binders and/or mesoporous materials which may include sodium metasilicate, lignosulfate, epoxy, ceramic slurry, clay slurry, cementitious slurry, plaster, mortar, starch, sugar, syrup, molasses, acrylic paint, enamel paint, biochar, pyrolysis ash, activated carbon, carbon nano-powder, zeolite(s), aluminosilicate, propylcarboxylic acid functionalized silica, and/or silica nanoparticles. As the magmatic 104 is exposed to the solution 106 over a period of time (e.g., 30 seconds, 5 minutes, 10 min, etc.), the magmatic 104 may form into a foamed mass agglomerate as binders and/or mesoporous material from the solution 106 incorporated with the porous vesicular structure of the magmatic 104, thereby imparting mesoporous properties and increasing the surface area and ion exchange benefits of the magmatic 104.

Figure 1B:
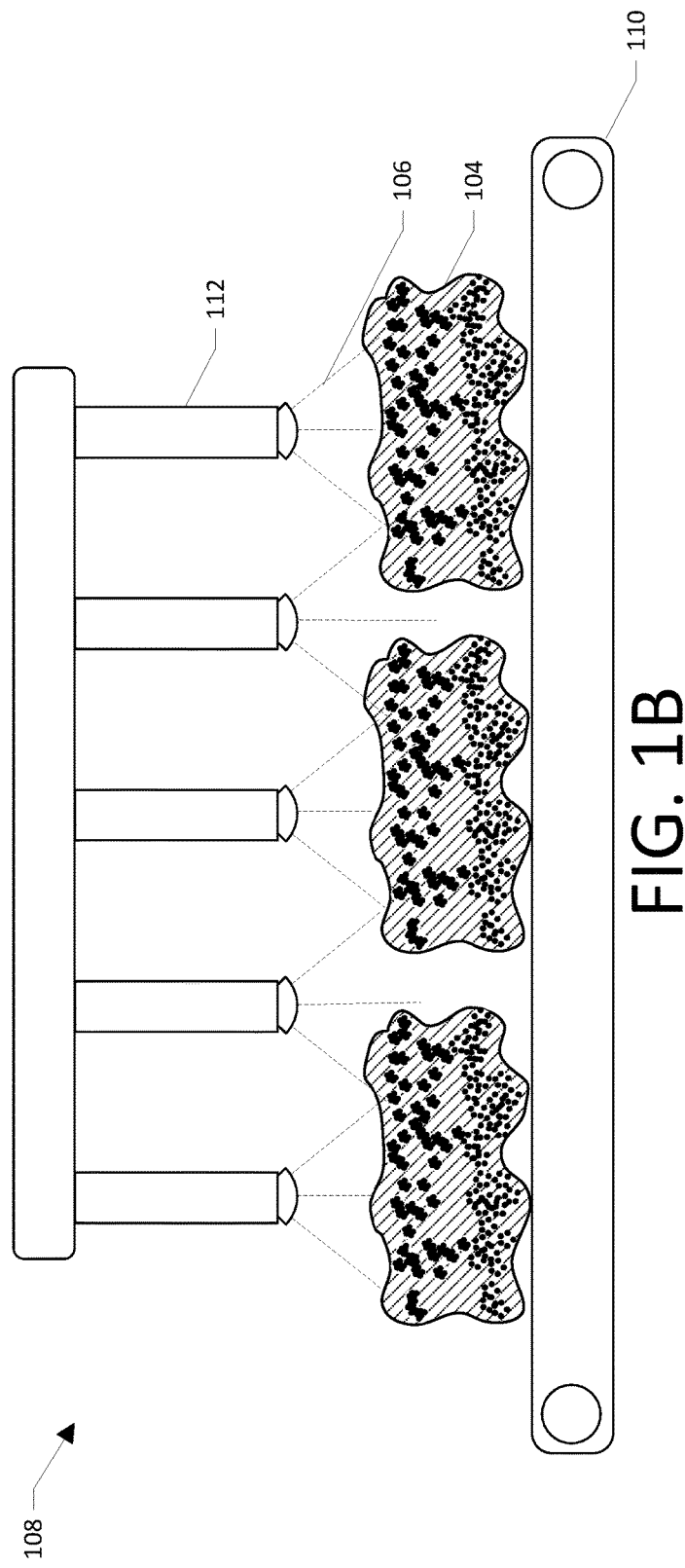
FIG. 1B illustrates an example mesoporous cellular magmatic being introduced to a solution spray.

FIG. 1B illustrates an example system 108 including a conveyor 110 and one or more emitters 112 configured to disperse the solution 106 onto the magmatic 104. For example, the solution 106 (e.g., the zeolite forming solution) may be sprayed onto the magmatics 104 via the emitters 112 and deposit the solution 106 in the form of a mist and/or spray. In some cases, once the once the magmatic 104 is formed, it may be allowed to come in contact with the solution 106 that causes zeolite formation and/or growth by being placed on the conveyor 110 and passed beneath the emitters 112 as the emitters 112 dispense the solution 106.

In some examples, the solution 106 (e.g., the binder and/or mesoporous material solution) may be sprayed onto the magmatics 104 via the emitters 112 and deposit the solution 106 in the form of a mist and/or spray. In some cases, once the once the magmatic 104 is formed, it may be allowed to come in contact with the solution 106 by being placed on the conveyor 110 and passed beneath the emitters 112 as the emitters 112 dispense the solution 106. In some cases, once the solution 106 has been applied to the magmatic 104, the magmatic 104 may be passed under another kiln (e.g., secondary kiln) configured to dry the magmatic 104 subsequent to the magmatic 104 being introduced to the solution 106. In some examples, subsequent to the magmatic 104 being introduced to the solution 106 and the magmatic 104 drying, the magmatic 104 may be referred to as a magmatic agglomerate.

In some examples, during formation of the magmatics 104, heat is applied as described herein to cause a foamed mass to form. The foamed mass may include one or more pores and/or cells, which may be closed cell (such as closed cell 202) and/or open cell (such as open cell 204). The solution 106 may aggregate in the void of the cells and bind with the cell wall and/or not bind with the cell wall such that the solution 106 "floats" or is otherwise not affixed to the cell wall. By so doing, mesoporous and/or nanoporous regions between individual solution 106 components may be formed.

Figure 2:
FIG. 2 illustrates a cross-sectional view of an example mesoporous cellular magmatic with floating vitreous material.

FIG. 2 illustrates a cross-sectional view of an example mesoporous cellular magmatic 200 with floating vitreous material. While FIG. 2 shows the mesoporous cellular magmatic 200 having flat sides and being approximately rectangular in shape, this shape is provided by way of example and is not limiting. The exterior of the magmatic 200 may be of any shape and/or may be of a desired shape that is designed and obtained during manufacture of the magmatic 200. The components of the magmatic 200 are described below by way of example.

For example, the magmatics 200 may be configured to bind a crystalline phase into the overall amorphous structure while making the crystalline phase available for interaction with other substances. In examples, the crystalline phases are batch chemical phases (high refractory ceramic species) and/or crystalline phases derived from a phase change or chemical reaction with other crystalline or glassy components. Further, secondary species can be derived during firing or upon specific chemical treatment postproduction—imbuing an article that is predominately amorphous with a crystalline fraction.

The magmatics 200 may have closed cell structures 202 and/or open cell structures 204. For example, a closed cell structure 202 may comprise, in either the amorphous phases and/or the crystalline phases, an open space that is not connected to other open spaces. By way of example, the magmatic 200 may have open spherical voids in the amorphous phases and/or the crystalline phases. When those spherical voids are not connected to other spherical voids, the voids may be closed cell. When those spherical voids are connected to other spherical voids, the voids may be open cell. The cells may be of uniform or about uniform size throughout the magmatic structure, or some or all of the cells may differ in size. Additionally, while spherical voids are described herein by way of example, various other shapes of voids may be generated. In some examples, the crystalline phase may not be associated with or otherwise contact the open cell structures 204 and/or closed cell structures 202. In other examples, the crystalline phase may make up at least a portion of the wall of at least one cell structure (whether closed or open celled) in the magmatic 200. In addition to the above, the magmatic 200 may include one or more non-vesicular pores, which may be described as tunnels or otherwise tubes that run through at least a portion of the magmatic 200. In some cases, the magmatic 200 may be described as having a majoritively open cell structure (e.g., 80%-100% open cell structure). In some cases, the magmatic 200 may be described as having a majoritively closed cell structure (e.g., 80%-100% closed cell structure).

In addition to the above, one or more reactive agents may be applied to the magmatic 200 to imbue one or more portions of the magmatic 200 with reactive properties. For example, the reactive agents may be selected during manufacture of the magmatics 200 and may be disposed on certain portions of the resulting magmatic. By way of example, reactive agents may be disposed on one or more cell walls of a closed 202 and/or open cell 204 void in the magmatic 200. In some examples, a reactive crystalline agent may be disposed on a first portion of the magmatic 200 while a reactive amorphous agent may be disposed on a second portion of the magmatic. Additionally, one or more reactive agents may be disposed on an exterior portion of the magmatic 200, such as when a post-production imbuing is utilized. In these examples, the exterior reactive agent may be the same or different from the reactive agent disposed within the magmatic 200. Additionally, the exterior reactive agent may penetrate at least a portion of the magmatic, and in some examples may penetrate one or more of the cell structures of the magmatic 200.

Engineered mesoporous cellular magmatics 200 may be engineered cellular magmatics as described herein but with reactive and/or non-reactive bodies 206 that are enclosed and/or fused within the cells of the structure. This may lead to greatly increasing the reactive surface area of the material while establishing pore structures and/or vesicular corridors that contain openings ranging from two nanometers to one millimeter. To do so, vitreous materials 206, also referred to herein as infiltration materials 206 may be added to the precursor materials and/or may be added following formation of a foamed mass. Infiltration material 206 describes any material that is configured to resist becoming a constituent of the pyroplastic mass forming the cell wall either because it has a higher softening and/or melting temperature, and/or because the surface chemistry of the infiltration material 206 is resistant to incorporation into the cell wall mass, and/or because the surface chemistry incorporates a blowing agent that decomposes at a lengthier dwell time or at a higher peak in temperature, causing the material to infiltrate and remain within a cell that has resulted from the expansion of the blowing agent or agents.

The vitreous materials 206 may include at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, pyrolysis ash, Sodium Nitrate, Sodium Sulphate, Sodium Silica-fluoride, and/or Zinc Oxide, for example. Selection of the infiltration material(s) 206 for a given application may be based at least in part on the desired characteristics, including surface chemistry of the infiltration material particles, whether the infiltration materials 206 are to be fixed or floating in cells of the foamed mass, and the desired porosity of the resulting foamed mass.

During formation of the mesoporous cellular magmatic 200, heat is applied as described herein to cause a foamed mass to form. The foamed mass may include one or more pores and/or cells, which may be closed cell 202 and/or open cell 204. The infiltration material 206 may aggregate in the void of the cells and bind with the cell wall and/or not bind with the cell wall such that the infiltration material "floats" or is otherwise not affixed to the cell wall. By so doing, mesoporous and/or nanoporous regions between individual infiltration material components may be formed.

The formation of a mesoporous cellular magmatic 200 may be achieved in one of multiple ways. For example, one or more of the precursor materials, including the silicate material, the blowing agent, the infiltration material 206, and/or one or more other materials such as a reactive agent may be sufficiently pulverized such that the particle size of one or more of these materials is in the micrometer and/or nanometer size range. When the vitreous material 206 is pulverized to this size range, the space between particles when enclosed in the foamed mass may be in the mesoporous and/or nanoporous size range. Additionally, or alternatively, the vitreous material 206 may be added to the foamed mass after formation. When the vitreous material 206 is sufficiently small and the foamed mass includes at least some open cells, the vitreous material 206 may filter in through the vesicular corridors and become entrapped therein. Additionally, or alternatively, the vitreous material 206 may be applied as a coating to the foamed mass. The coating may adhere to the exterior of the foamed mass and may cause that exterior of the foamed mass to have mesoporous and/or nanoporous regions. Additionally, or alternatively, the foamed mass may be at least partially mineralized. The act of mineralization may cause the infiltration materials 206, and/or other materials of the foamed mass, to reduce in size and/or become more compact, leading to mesoporous and/or nanoporous regions.

In some examples, the infiltration material 206 may include zeolite materials that were introduced to the cellular magmatic 200 after the cellular magmatic 200 was heated by a kiln. For example, once the cellular magmatic 200 is formed, it may be allowed to come in contact with a solution that causes zeolite formation and/or growth. In some cases, the solution may be absorbed by the cellular magmatic 200. In some examples, the cellular magmatic 200 may exit the kiln and may then be made to come in contact with a zeolite forming solution which may include one or more of a solution containing alkali aluminates, alkali/alkaline hydroxides, alkali carbonates, water glass, and/or tetramethylammonium hydroxide. In some cases, the solution (e.g., the zeolite forming solution) may be sprayed onto the cellular magmatic 200 via emitters that deposit the solution in the form of a mist and/or spray. In other cases, the cellular magmatic 200 may be introduced to the solution via a solution bath where the cellular magmatic 200 is immersed in a bath of zeolite inciting solutions, such that zeolites begin to form in the cellular magmatic 200. As the cellular magmatic 200 is exposed to the solution (e.g., via the emitters and/or via the bath) over a period of time (e.g., 30 seconds, 5 minutes, 10 min, etc.), formation of zeolites within the porous vesicular structure of the ECM may impart mesoporous properties and may increase the surface area and ion exchange benefits of the cellular magmatic 200.

In some examples, the infiltration material 206 may include binder and/or the mesoporous materials that were introduced to the cellular magmatic 200 after the cellular magmatic 200 was heated by a kiln. For example, once the cellular magmatic 200 is formed, it may be allowed to come in contact with a solution containing the binder and/or the mesoporous material that causes the binder and/or the mesoporous material to be incorporated into the cellular magmatic 200. In some cases, the solution may be absorbed by the cellular magmatic 200. In some examples, an cellular magmatic 200 exiting the kiln may then be made to come in contact with a solution containing one or more binders and/or mesoporous materials which may include sodium metasilicate, lignosulfate, epoxy, ceramic slurry, clay slurry, cementitious slurry, plaster, mortar, starch, sugar, syrup, molasses, acrylic paint, enamel paint, biochar, pyrolysis ash, activated carbon, carbon nano-powder, zeolite(s), aluminosilicate, propylcarboxylic acid functionalized silica, and/or silica nanoparticles. In some cases, the solution (e.g., the binder and/or the mesoporous material solution) may be sprayed onto the cellular magmatic 200 via emitters that deposit the solution in the form of a mist and/or spray. In other cases, the cellular magmatic 200 may be introduced to the solution via a solution bath (e.g., a slurry solution, liquid solution, etc.) where the cellular magmatic 200 is immersed in a bath of solutions, such that the binder and/or the mesoporous material begin to form in the cellular magmatic 200. As the cellular magmatic 200 is exposed to the solution (e.g., via the emitters and/or via the bath) over a period of time (e.g., 30 seconds, 5 minutes, 10 min, etc.), formation of the binder and/or the mesoporous material within the porous vesicular structure of the cellular magmatic 200 may impart mesoporous properties and may increase the surface area and ion exchange benefits of the cellular magmatic 200. In some cases, after the solution has been applied to the cellular magmatic 200, the cellular magmatic 200 may be passed under another kiln (e.g., secondary kiln) configured to dry the cellular magmatic 200 subsequent to the cellular magmatic 200 being introduced to the solution. In some examples, subsequent to the cellular magmatic 200 being introduced to the solution and the cellular magmatic 200 drying, the cellular magmatic 200 may be referred to as an cellular magmatic 200 agglomerate.

With respect to FIG. 2, the infiltration materials 206 are shown as "floating" or otherwise not fixed to the walls of the magmatic cells.

Figure 3:
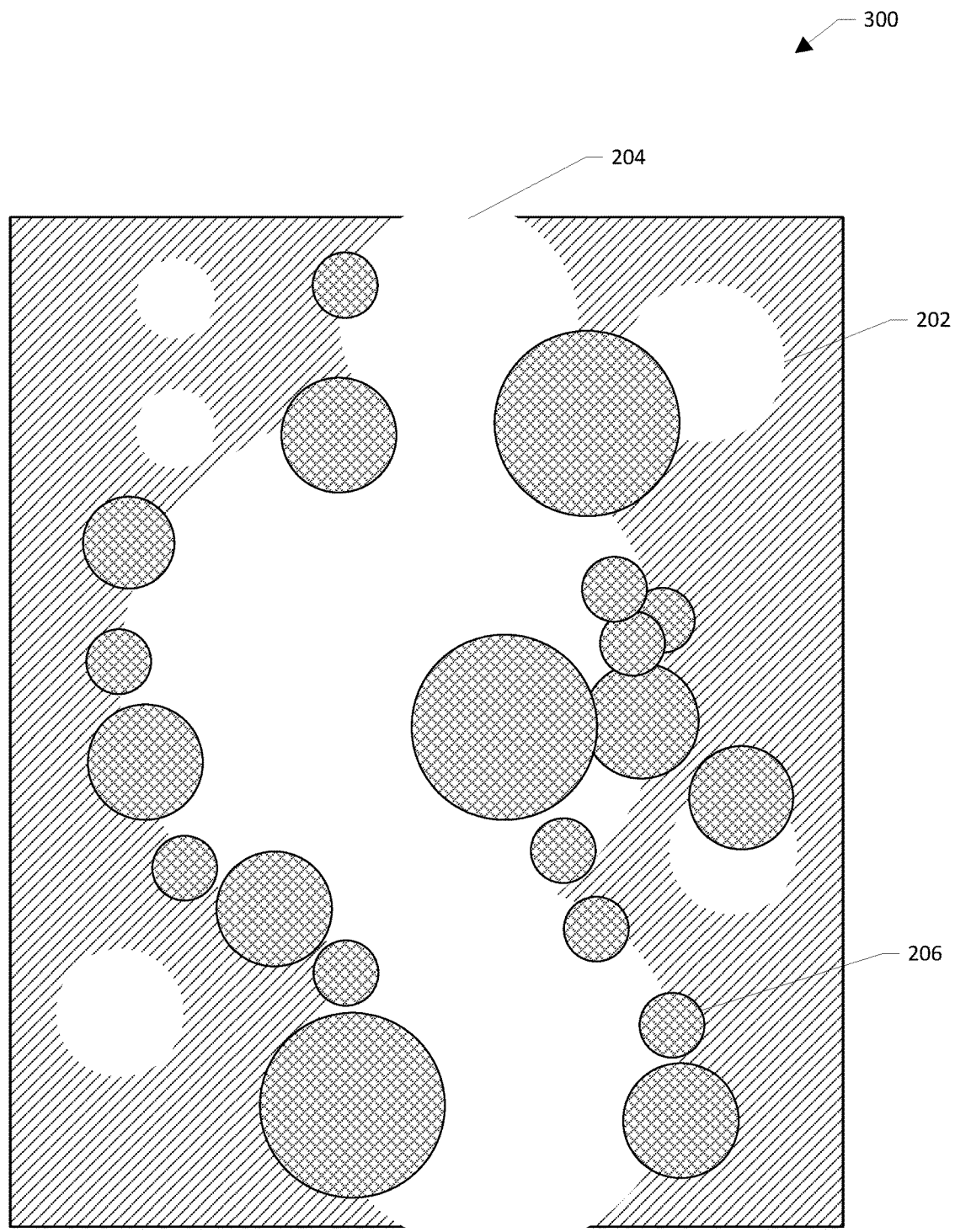
FIG. 3 illustrates a cross-sectional view of an example mesoporous cellular magmatic with fixed vitreous material.

FIG. 3 illustrates a cross-sectional view of an example mesoporous cellular magmatic 300 with fixed vitreous material. While FIG. 3 shows the mesoporous cellular magmatic 300 having flat sides and being approximately rectangular in shape, this shape is provided by way of example and is not limiting. The exterior of the magmatic 300 may be of any shape and/or may be of a desired shape that is designed and obtained during manufacture of the magmatic 300. The components of the magmatic 300 are described below by way of example.

The magmatics 300 may have the same or similar properties as the magmatics 200 described with respect to FIG. 2. However, unlike the floating infiltration materials 206 in FIG. 2, FIG. 3 illustrates the use of fixed infiltration materials 206. During formation of the mesoporous cellular magmatic 300, heat is applied as described herein to cause a foamed mass to form. The foamed mass may include one or more pores and/or cells, which may be closed cell and/or open cell. The infiltration material 206 may aggregate in the void of the cells and bind with the cell wall. By so doing, mesoporous and/or nanoporous regions between individual infiltration material components may be formed. It should be understood that in any given mesoporous cellular magmatic, the infiltration material 206 may be floating and/or fixed, and in some magmatics the infiltration material particles may be both floating and fixed.

In some examples, the infiltration material 206 may include zeolite materials that were introduced to the cellular magmatic 300 after the cellular magmatic 300 was heated by a kiln. For example, once the cellular magmatic 300 is formed, it may be allowed to come in contact with a solution that causes zeolite formation and/or growth. In some cases, the solution may be absorbed by the cellular magmatic 300. In some examples, the cellular magmatic 300 may exit the kiln and may then be made to come in contact with a zeolite forming solution which may include one or more of a solution containing alkali aluminates, alkali/alkaline hydroxides, alkali carbonates, water glass, and/or tetramethylammonium hydroxide. In some cases, the solution (e.g., the zeolite forming solution) may be sprayed onto the cellular magmatic 300 via emitters that deposit the solution in the form of a mist and/or spray. In other cases, the cellular magmatic 300 may be introduced to the solution via a solution bath where the cellular magmatic 300 is immersed in a bath of zeolite inciting solutions, such that zeolites begin to form in the cellular magmatic 300. As the cellular magmatic 300 is exposed to the solution (e.g., via the emitters and/or via the bath) over a period of time (e.g., 30 seconds, 5 minutes, 10 min, etc.), formation of zeolites within the porous vesicular structure of the ECM may impart mesoporous properties and may increase the surface area and ion exchange benefits of the cellular magmatic 300.

Figure 4:
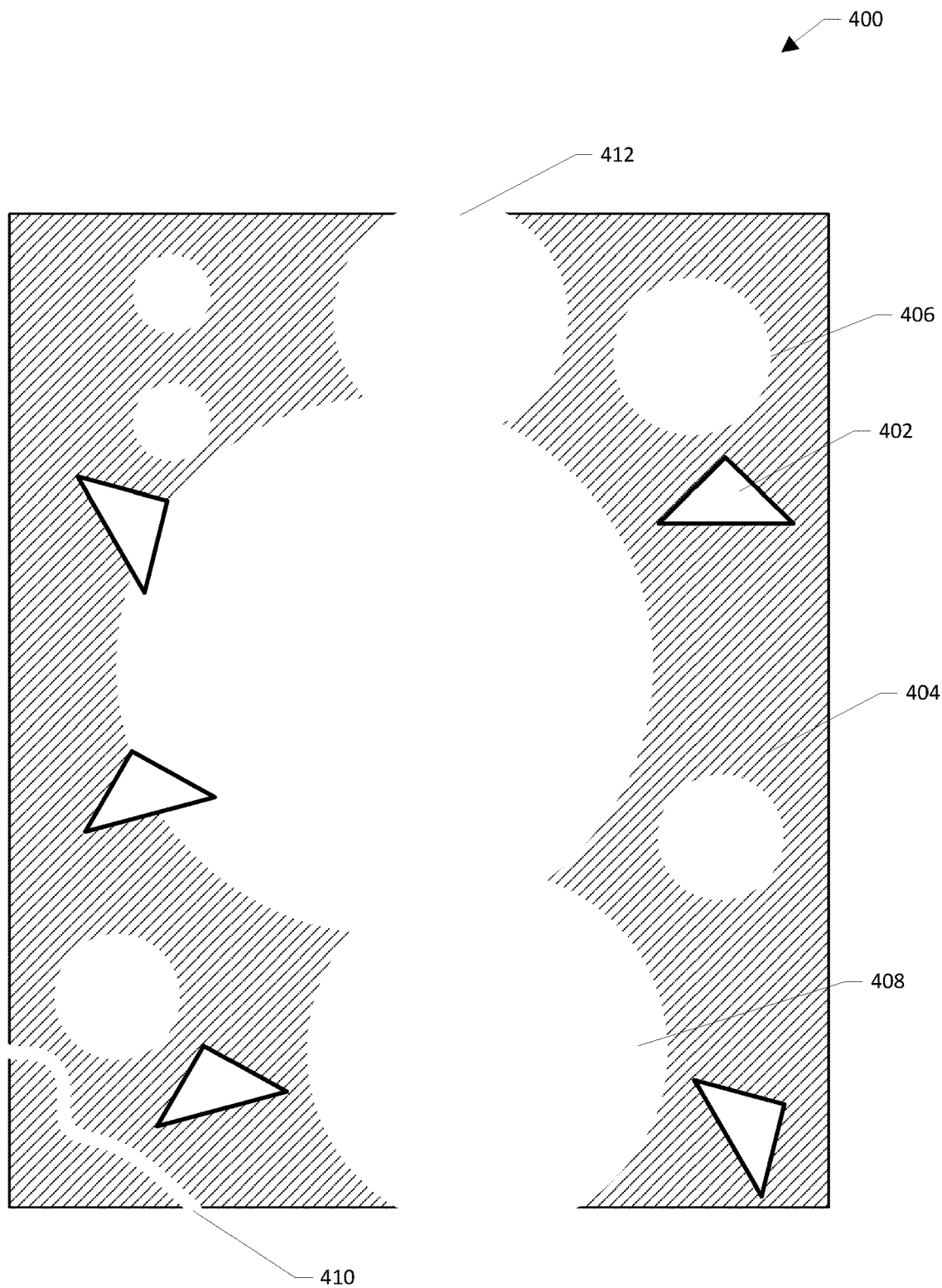
FIG. 4 illustrates a cross-sectional view of an example polyphase cellular magmatic that may include vitreous material.

FIG. 4 illustrates a cross-sectional view of an example mesoporous cellular magmatic 400 with open and closed cells, along with non-vesicular pores. While FIG. 4 shows the mesoporous cellular magmatic 400 having flat sides and being approximately rectangular in shape, this shape is provided by way of example and is not limiting. The exterior of the magmatic 400 may be of any shape and/or may be of a desired shape that is designed and obtained during manufacture of the magmatic 400. The components of the magmatic 400 are described below by way of example.

For example, the magmatics 400 may be configured to bind a crystalline phase 402 into the overall amorphous structure 404 while making the crystalline phase 402 available for interaction with other substances. In examples, the crystalline phases 402 are batch chemical phases (high refractory ceramic species) and/or crystalline phases 402 derived from a phase change or chemical reaction with other crystalline or glassy components. Further, secondary species can be derived during firing or upon specific chemical treatment postproduction—imbuing an article that is predominately amorphous with a crystalline fraction.

The magmatics 400 may also have closed cell structures 406 and/or open cell structures 408. For example, a closed cell structure 406 may comprise, in either the amorphous phases 404 and/or the crystalline phases 402, an open space that is not connected to other open spaces. By way of example, the magmatic 400 may have open spherical voids in the amorphous phases 404 and/or the crystalline phases 402. When those spherical voids are not connected to other spherical voids, the voids may be closed cell. When those spherical voids are connected to other spherical voids, the voids may be open cell. The cells may be of uniform or about uniform size throughout the magmatic structure, or some or all of the cells may differ in size. Additionally, while spherical voids are described herein by way of example, various other shapes of voids may be generated. In some examples, the crystalline phase 402 may not be associated with or otherwise contact the open cell structures 408 and/or closed cell structures 406. In other examples, the crystalline phase 402 may make up at least a portion of the wall of at least one cell structure (whether closed or open celled) in the magmatic 400. In addition to the above, the magmatic 400 may include one or more non-vesicular pores 410, which may be described as tunnels or otherwise tubes that run through at least a portion of the magmatic 400.

The magmatics 400 described herein may include a rigid foamed mass, typified by an appearance akin to pumice or volcanic rock, that is manufactured in a kiln or furnace. Such articles may exhibit both open or closed-cell structures 406, 408, as well as open and closed cell structures 406, 408 in the same article. Said articles may also exhibit pore structure 402 comprised of interconnected cells where cell walls have collapsed to form subsequent vesicular corridors, or pore structures 412 without creating discontinuities in cells, or a combination of these aspects. ECM differ from foam glass in that they are comprised of vitreous and crystalline batch components. ECMs have a reduced glassy character and often a lower silica content, wherein the silica acts primarily as the key glass forming species within the glassy phase and governs the viscoelastic properties of the ECM within a given environment. ECMs are formulated to perform specific tasks and react beneficially in specific environments and applications to produce directed outcomes—unlike foam glass, which strives to be inert. ECMs differ, in general, from ceramic foams as well in that they require less heat to produce, and yet have the ability to agglomerate multiple silica, clay, and mineral constituents into stable cellular structures.

Figure 6:
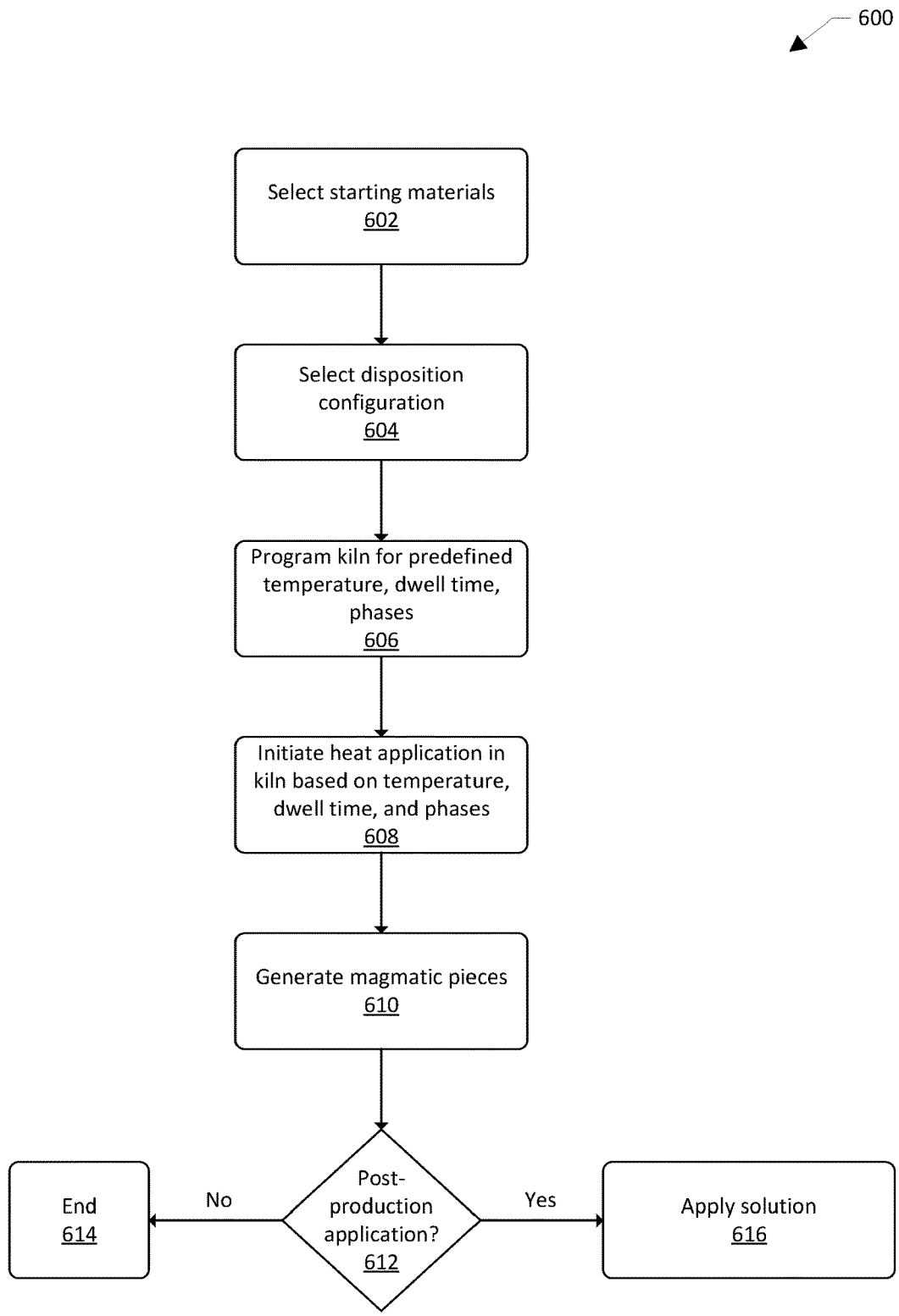
FIG. 6 is a flowchart illustrating another example process for generating mesoporous cellular magmatics.

FIGS. 5-7 illustrate processes for generation of mesoporous cellular magmatics. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 7, although the processes may be implemented in a wide variety of other environments, architectures and systems.

FIG. 5 is a flowchart illustrating an example process 500 for generating mesoporous cellular magmatics including zeolite material. The order in which the operations or steps are described is not intended to be construed as a limitation, and any number of the described operations may be combined in any order and/or in parallel to implement process 500.

At block 502, the process 500 may include creating a mixture of: a pulverized or powdered glass; a pulverized or powdered blowing agent; and a vitreous material having a melting temperature higher than the pulverized or powdered glass and the pulverized or powdered blowing agent. For example, the glass and/or blowing agent may be pulverized and/or powdered to a unit size specific to the application at issue and the desired resulting magmatic. In examples, the grain size of the glass and/or blowing agent components may be smaller, sometimes significantly smaller, than the intended voids to be generated in the resulting magmatic. The glass component may include, for example, one or more of soda-lime glass, flint, container glass, a-glass, flat glass, e-glass, c-glass, ar-glass, s-glass, single phase borosilicate glass, phase separated borosilicate, fused silica, coal slags, metal slags, nickel slag, smelting slags, mineral wool, and/or boron. It should be understood that these glass materials are provided by way of illustration, and not as a limitation. The blowing agents may include one or more of aluminum slag, anthracite, activated carbon, calcium carbonate, calcium sulfate, carbon black, cellulose, coal, fly ash, pyrolysis ash, graphite, magnesium carbonate, potassium nitrate, silicon carbide, silicon nitride, sodium hydroxide, sodium nitrate, sodium, nitrite, and/or zinc oxide. Again, it should be understood that these glass materials are provided by way of illustration, and not as a limitation.

The mixture may also include one or more infiltration materials. The infiltration materials may include, for example, at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, pyrolysis ash, Sodium Nitrate, Sodium Sulphate, Sodium Silica-fluoride, Zinc Oxide. Again, it should be understood that these infiltration materials are provided by way of illustration, and not as a limitation.

At block 504, the process 500 may include applying heat to the mixture at a first temperature and for a first dwell time until: at least a portion of the mixture sinters; at least a portion of the pulverized or powdered glass foams to form a foamed mass; at least a portion of the blowing agent decomposes; and the vitreous material is enclosed by pores of the foamed mass. For example, the resulting mixture may be placed into a kiln or other heating component and a temperature may be applied until at least a portion of the mixture decomposes into a gas or gases, forming a distribution of cellular voids within the resulting foamaceous mass. In situations where an infiltration material is included in the mixture, application of heat in the kiln may be performed until, in examples, the infiltration material is enclosed within pores of the foamed mass.

At block 506, the process 500 may include applying a solution configured to cause the synthesis of zeolites upon the foamed mass. For example, once an ECM (e.g., foamed mass) is formed, it may be allowed to come in contact with a solution that causes mineralization such as zeolite formation and/or growth (e.g., synthesis of zeolites). In some cases, the solution may be absorbed by the ECM. In some examples, an ECM exiting the kiln may then be made to come in contact with a zeolite forming solution which may include one or more of a solution containing alkali aluminates, alkali/alkaline hydroxides, alkali carbonates, water glass, sodium metasilicate, and/or tetramethylammonium hydroxide. In some cases, the solution (e.g., the zeolite forming solution) may be sprayed onto the ECM via emitters that deposit the solution in the form of a mist and/or spray. In other cases, the ECM may be introduced to the solution via a solution bath where the ECM is immersed in a bath of zeolite inciting solutions, such that zeolites begin to form in the ECM. As the ECM is exposed to the solution (e.g., via the emitters and/or via the bath) over a period of time (e.g., 30 seconds, 5 minutes, 10 min, etc.), formation of zeolites within the porous vesicular structure of the ECM may impart mesoporous properties and may increase the surface area and ion exchange benefits of the ECM.

Additionally, or alternatively, the process 500 may include applying heat at a second temperature that is more than the first temperature until: discontinuities in the fraction of cells occurs such that the fraction of cells become interconnected; and a resulting foam mass includes an amorphous phase and a crystalline phase. For example, the temperature and dwell times may be regulated such that at least a fraction of the cells of the foamaceous mass become interconnected by discontinuities in the cell walls. This discontinuity may be caused at least in part by pressure from escaping gases and/or constituent secondary blowing agents having a higher decomposition temperature than other blowing agents. The temperatures, dwell times, and heating gradients used with respect to the kiln may be adjusted to achieve a desired resulting magmatic. For example, adjusting one or more of the temperature, the dwell times, and/or the heating gradients may result in magmatics with differing cell size, porosity, open versus closed cells, inclusion or exclusion of non-vesicular pores, inclusion or exclusion of reactive agents on cell walls and/or other portions of the magmatic, differing densities, inclusion of more or less crystalline phase, inclusion or exclusion of layers, inclusion or exclusion of reactive agent derivatives, etc.

The first temperature could be around 500 Celsius. Which is then ramped to a temperature of 850 Celsius at a rate of 20 K/min followed by a hold at the temperature of 850 Celsius for 15 minutes. This is then subsequently quenched at a fast rate (typically exceeding 50 K/min) until a low temperature (such as 200 Celsius) is reached.

Additionally, or alternatively, the process 500 may include the temperature being from about from about 20 degrees Celsius to about 220 degrees Celsius for about 10 minutes, the second temperature being from about 225 degrees Celsius to about 350 degrees Celsius for about 10 minutes, a third temperature being from about 350 degrees Celsius to about 500 degrees Celsius for about 10 minutes, and a fourth temperature being from about 500 degrees Celsius to about 800 degrees Celsius for about 20 minutes.

Additionally, or alternatively, the process 500 may include the heat being applied at the second temperature for a period of time until at least two layers are formed in the foam mass.

Additionally, or alternatively, the process 500 may include, after creating the mixture and based at least in part on an intended structure of the foam mass, selecting a disposition configuration for the mixture on a conveyor belt configured to transport the mixture to a kiln for applying the heat, the disposition configuration including at least one of a layer, a pile, or a band. The process 500 may also include disposing the mixture on the conveyor belt utilizing the disposition configuration.

FIG. 6 is a flowchart illustrating another example process 600 for generating mesoporous cellular magmatics. The order in which the operations or steps are described is not intended to be construed as a limitation, and any number of the described operations may be combined in any order and/or in parallel to implement process 600.

At block 602, the process 600 may include selecting starting materials for forming a mesoporous cellular magmatic. For example, the starting materials may include a glass component, a blowing agent, and/or one or more reactive agents.

The glass component may include, for example, one or more of soda-lime glass, flint, container glass, a-glass, flat glass, e-glass, c-glass, ar-glass, s-glass, single phase borosilicate glass, phase separated borosilicate, fused silica, coal slags, metal slags, nickel slag, smelting slags, mineral wool, and/or boron. It should be understood that these glass materials are provided by way of illustration, and not as a limitation.

The blowing agents may include one or more of aluminum slag, anthracite, activated carbon, calcium carbonate, calcium sulfate, carbon black, cellulose, coal, fly ash, graphite, magnesium carbonate, potassium nitrate, silicon carbide, silicon nitride, sodium hydroxide, sodium nitrate, sodium nitrite, and/or zinc oxide. Again, it should be understood that these glass materials are provided by way of illustration, and not as a limitation.

The infiltration materials may include, for example, at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, Sodium Nitrate, Sodium Sulphate, Sodium Silica-fluoride, Zinc Oxide. Again, it should be understood that these infiltration materials are provided by way of illustration, and not as a limitation.

At block 604, the process 600 may include selecting a disposition configuration for the mixture of materials. For example, when a material dispenser is used, it may be caused to release the mixture onto the conveyor element such that a layer and/or piles of the material, and or bands of the material are formed on the conveyor element. It should be understood that while a blowing agent and a constituent glass material are utilized herein by way of example, the process may include more than one blowing agent and more than one other constituent material. A fundamental cellular magmatic may include at least one blowing agent, and at least one material capable of being sintered into a foamaceous mass in the presence of a blowing agent. Said material need not be glass in a strict sense, but should, under temperature, and in concert with either a blowing agent or additional constituent material, produce a crystalline phase within the magmatic, subordinate to the amorphous properties generated and/or imbued by the vitreous components. The product exiting the kiln may be compacted and/or fractured (either naturally or by applying force). The fractured product may be collected and may be utilized for one or more purposes as described herein.

At block 606, the process 600 may include programming a kiln for a predefined temperature, dwell time, and phases. For example, the kiln may be associated with one or more computing components that may be programmed to achieve a desired temperature, dwell time, and heating phases within the kiln.

At block 608, the process 600 may include initiating heat application in kiln based on temperature, dwell time, and phases. For example, an operator may provide user input to cause the computing components to initiate the heating application as programmed. In other examples, a scheduled start time may be programmed based at least in part on a day and/or time, and/or when a condition is satisfied, such as when the starting materials are determined to be present and/or when safety measures are satisfied, such as safety barriers being determined to be cleared and/or the absence of human presence in some or all of the components of the system that includes the kiln.

At block 610, the process 600 may include generating magmatic pieces. For example, the magmatic may be generated as described above and herein. The magmatic may be configured to bind a crystalline phase into the overall amorphous structure while making the crystalline phase available for interaction with other substances. In examples, the crystalline phases are batch chemical phases (high refractory ceramic species) and/or crystalline phases derived from a phase change or chemical reaction with other crystalline or glassy components. Further, secondary species can be derived during firing or upon specific chemical treatment postproduction—imbuing an article that is predominately amorphous with a crystalline fraction. In other examples, the foamed mass may comprise an amorphous phase only or a crystalline phase only.

In addition to the above, one or more infiltration materials may be applied to the magmatic to imbue one or more portions of the magmatic with reactive properties and/or certain porosities. For example, the infiltration materials may be selected during manufacture of the magmatics and may be disposed on certain portions of the resulting magmatic. By way of example, one or more of the precursor materials, including the silicate material, the blowing agent, the infiltration material, and/or one or more other materials such as a reactive agent may be sufficiently pulverized such that the particle size of one or more of these materials is in the micrometer and/or nanometer size range. When the vitreous material is pulverized to this size range, the space between particles when enclosed in the foamed mass may be in the mesoporous and/or nanoporous size range.

At block 612, the process 600 may include determining whether post-production application of a reactive agent is to occur. For example, when the kiln is programmed as described above, part of the programming may include an indication of whether post-production application of an infiltration material is to occur. In other examples, the input may include selection of a given reactive property on an exterior portion of the magmatic. In these examples, the computing components of the kiln may be configured to determine that post-production application of an infiltration material is to occur to achieve the indicated reactive property.

In instances where post-production application of the infiltration material is not to occur, the process 600 may end at block 614. In these examples, the resulting magmatic may be in a state indicated to be desired when the programming input was received such that no additional production steps are needed.

In instances where post-production application is to occur, the process 600 may include, at block 616, applying a solution to the magmatic pieces. For example, once an ECM (e.g., foamed mass, magmatic pieces, etc.) is formed, it may be allowed to come in contact with a solution that causes zeolite formation and/or growth (e.g., synthesis of zeolites). In some cases, the solution may be absorbed by the ECM. In some examples, an ECM exiting the kiln may then be made to come in contact with a zeolite forming solution which may include one or more of a solution containing alkali aluminates, alkali/alkaline hydroxides, alkali carbonates, water glass, sodium metasilicate, and/or tetramethylammonium hydroxide. In some cases, the solution (e.g., the zeolite forming solution) may be sprayed onto the ECM via emitters that deposit the solution in the form of a mist and/or spray. In other cases, the ECM may be introduced to the solution via a solution bath where the ECM is immersed in a bath of zeolite inciting solutions, such that zeolites begin to form in the ECM. As the ECM is exposed to the solution (e.g., via the emitters and/or via the bath) over a period of time (e.g., 30 seconds, 5 minutes, 10 min, etc.), formation of zeolites within the porous vesicular structure of the ECM may impart mesoporous properties and may increase the surface area and ion exchange benefits of the ECM.

FIG. 7 is a flowchart illustrating an example process 700 for generating mesoporous cellular magmatics including a binding and/or mesoporous solution. The order in which the operations or steps are described is not intended to be construed as a limitation, and any number of the described operations may be combined in any order and/or in parallel to implement process 700.

At block 702, the process 700 may include creating a mixture of: a pulverized or powdered glass; a pulverized or powdered blowing agent; a vitreous material having a melting temperature higher than the pulverized or powdered glass and the pulverized or powdered blowing agent; and a non-sintering mesoporous agent. For example, the glass and/or blowing agent may be pulverized and/or powdered to a unit size specific to the application at issue and the desired resulting magmatic. In examples, the grain size of the glass and/or blowing agent components may be smaller, sometimes significantly smaller, than the intended voids to be generated in the resulting magmatic. The glass component may include, for example, one or more of soda-lime glass, flint, container glass, a-glass, flat glass, e-glass, c-glass, ar-glass, s-glass, single phase borosilicate glass, phase separated borosilicate, fused silica, coal slags, metal slags, nickel slag, smelting slags, mineral wool, and/or boron. It should be understood that these glass materials are provided by way of illustration, and not as a limitation. The blowing agents may include one or more of aluminum slag, anthracite, activated carbon, calcium carbonate, calcium sulfate, carbon black, cellulose, coal, fly ash, graphite, magnesium carbonate, potassium nitrate, silicon carbide, silicon nitride, sodium hydroxide, sodium nitrate, sodium nitrite, and/or zinc oxide. Again, it should be understood that these glass materials are provided by way of illustration, and not as a limitation.

The mixture may also include one or more infiltration materials. The infiltration materials may include, for example, at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, Sodium Nitrate, Sodium Sulphate, Sodium Silica-fluoride, Zinc Oxide. Again, it should be understood that these infiltration materials are provided by way of illustration, and not as a limitation.

At block 704, the process 700 may include applying heat to the mixture at a first temperature and for a first dwell time until: at least a portion of the mixture sinters; at least a portion of the pulverized or powdered glass foams to form a foamed mass; at least a portion of the blowing agent decomposes; and the vitreous material is enclosed by pores of the foamed mass. For example, the resulting mixture may be placed into a kiln or other heating component and a temperature may be applied until at least a portion of the mixture decomposes into a gas or gases, forming a distribution of cellular voids within the resulting foamaceous mass. In situations where an infiltration material is included in the mixture, application of heat in the kiln may be performed until, in examples, the infiltration material is enclosed within pores of the foamed mass.

At block 706, the process 700 may include applying a solution containing a binder and/or mesoporous material upon the foamed mass. For example, once an ECM (e.g., foamed mass) is formed, it may be allowed to come in contact with a solution containing the binder and/or the mesoporous material that causes the binder and/or the mesoporous material to be incorporated into the ECM. In some cases, the solution may be absorbed by the ECM. In some examples, an ECM exiting the kiln may then be made to come in contact with a solution containing one or more binders and/or mesoporous materials which may include sodium metasilicate, lignosulfate, epoxy, ceramic slurry, clay slurry, cementitious slurry, plaster, mortar, starch, sugar, syrup, molasses, acrylic paint, enamel paint, biochar, pyrolysis ash, activated carbon, carbon nano-powder, zeolite(s), aluminosilicate, propylcarboxylic acid functionalized silica, and/or silica nanoparticles. In some cases, the solution (e.g., the binder and/or the mesoporous material solution) may be sprayed onto the ECM via emitters that deposit the solution in the form of a mist and/or spray. In other cases, the ECM may be introduced to the solution via a solution bath (e.g., a slurry solution, liquid solution, etc.) where the ECM is immersed in a bath of solutions, such that the binder and/or the mesoporous material begin to form in the ECM. As the ECM is exposed to the solution (e.g., via the emitters and/or via the bath) over a period of time (e.g., 30 seconds, 5 minutes, 10 min, etc.), formation of the binder and/or the mesoporous material within the porous vesicular structure of the ECM may impart mesoporous properties and may increase the surface area and ion exchange benefits of the ECM. In some cases, after the solution has been applied to the ECM, the ECM may be passed under another kiln (e.g., secondary kiln) configured to dry the ECM subsequent to the ECM being introduced to the solution. In some examples, subsequent to the ECM being introduced to the solution and the ECM drying, the ECM may be referred to as an ECM agglomerate.

Additionally, or alternatively, the process 700 may include regulating the first temperature and the first dwell time such that a fraction of cells associated with the foamed glass become interconnected. In examples, application of heat may be performed until, for example, the materials sinter and at least a portion of the mixture foams by thermal decomposition of the blowing agent and/or agents.

Additionally, or alternatively, the process 700 may include applying heat at a second temperature that is more than the first temperature until: discontinuities in the fraction of cells occurs such that the fraction of cells become interconnected; and a resulting foam mass includes an amorphous phase and a crystalline phase. For example, the temperature and dwell times may be regulated such that at least a fraction of the cells of the foamaceous mass become interconnected by discontinuities in the cell walls. This discontinuity may be caused at least in part by pressure from escaping gases and/or constituent secondary blowing agents having a higher decomposition temperature than other blowing agents. The temperatures, dwell times, and heating gradients used with respect to the kiln may be adjusted to achieve a desired resulting magmatic. For example, adjusting one or more of the temperature, the dwell times, and/or the heating gradients may result in magmatics with differing cell size, porosity, open versus closed cells, inclusion or exclusion of non-vesicular pores, inclusion or exclusion of reactive agents on cell walls and/or other portions of the magmatic, differing densities, inclusion of more or less crystalline phase, inclusion or exclusion of layers, inclusion or exclusion of reactive agent derivatives, etc.

The first temperature could be around 500 Celsius. Which is then ramped to a temperature of 850 Celsius at a rate of 20 K/min followed by a hold at the temperature of 850 Celsius for 15 minutes. This is then subsequently quenched at a fast rate (typically exceeding 50 K/min) until a low temperature (such as 200 Celsius) is reached.

Additionally, or alternatively, the process 700 may include the temperature being from about from about 20 degrees Celsius to about 220 degrees Celsius for about 10 minutes, the second temperature being from about 225 degrees Celsius to about 350 degrees Celsius for about 10 minutes, a third temperature being from about 350 degrees Celsius to about 500 degrees Celsius for about 10 minutes, and a fourth temperature being from about 500 degrees Celsius to about 800 degrees Celsius for about 20 minutes.

Additionally, or alternatively, the process 700 may include the heat being applied at the second temperature for a period of time until at least two layers are formed in the foam mass.

Additionally, or alternatively, the process 700 may include, after creating the mixture and based at least in part on an intended structure of the foam mass, selecting a disposition configuration for the mixture on a conveyor belt configured to transport the mixture to a kiln for applying the heat, the disposition configuration including at least one of a layer, a pile, or a band. The process 500 may also include disposing the mixture on the conveyor belt utilizing the disposition configuration.

Figure 8:
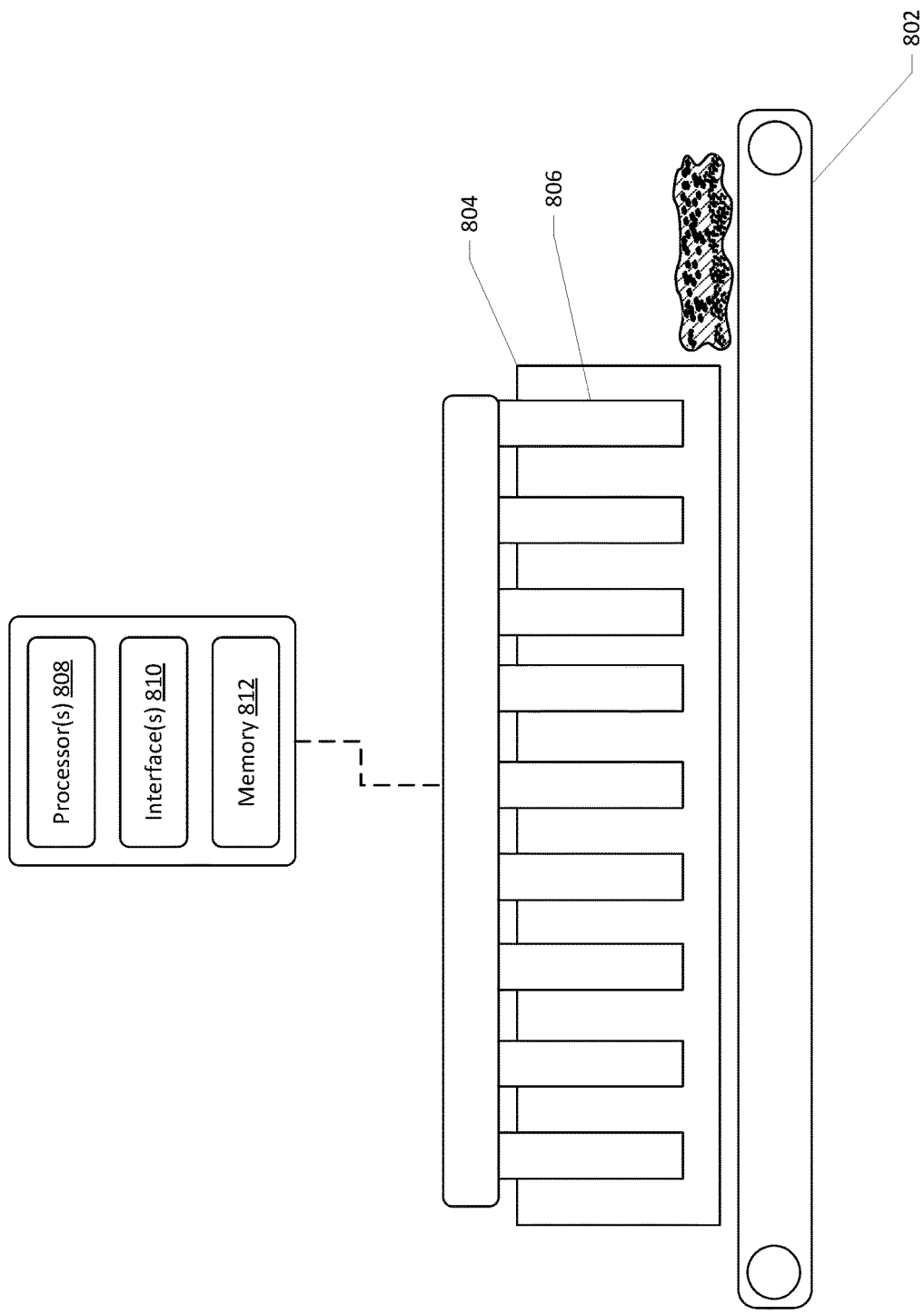
FIG. 8 illustrates a schematic view of a system for generating mesoporous cellular magmatics.

FIG. 8 illustrates a schematic view of a system 800 for generating mesoporous cellular magmatics.

In addition to the above, the system 800 may include, for example, computing components. Each of these components will be described below by way of example.

The conveyor element 802, which may be a conveyor belt, may be configured to move precursor materials into the kiln 804 and move produced mesoporous cellular magmatics from the kiln 804 to a holding container (not depicted). The conveyor element 802 may be configured to vary the speed at which the conveyor element 802 moves precursor materials. For example, the speed of movement of the conveyor element 802 may be adjustable such that an amount of time from when the precursor material enter the kiln 804 and when the produced mesoporous magmatics exit the kiln 804 may be varied. In examples, the amount of time may be between about 10 minutes and about 50 minutes.

Additionally, one or more hoppers may be configured to hold precursor materials. The hoppers may be positioned at a point before the kiln 804 such that as materials exit the hoppers and are transferred to the conveyor element 802, the conveyor element 802 may convey the materials into the kiln 804. The hoppers may be substantially adjacent to each other and each hopper may have an opening on an end of the hoppers proximal to the conveyor element 802. The opening may allow the precursor materials to flow from the hoppers onto the conveyor element 802. The opening may be adjustable such that more or less precursor material is allowed to flow from the hoppers to the conveyor element 802. The hoppers may also include a wheel, roller, and/or drum housed within the hoppers and configured to rotate to promote the flow of precursor material within the hoppers and through the opening. The wheel, roller, and/or drum may be configured to turn at various, adjustable speeds to increase or decrease the flow of precursor material from the hoppers to the conveyor element 802.

While one or more examples described herein discuss the hoppers generally holding precursor material, it should be understood that the hoppers may all hold the same precursor material or one or more of the hoppers may hold a precursor material that differs in one or more respects from precursor material held by another of the hoppers. For example, a precursor material may include a glass-grade silica powder, ground glass, and/or silica-lime glass, for example. The precursor materials may also include one or more foaming agents and/or reactive components. The types of precursor materials and/or the quantities of precursor materials, both within a given hopper and/or as between hoppers, may vary from hopper to hopper.

The kiln 804 may be configured to allow a portion of the conveyor element 802 to pass through at least a portion of the kiln 804 such that the precursor materials may enter an interior portion of the kiln 804, and mesoporous cellular aggregates may exit the kiln 804. For example, the kiln 804 may have a channel configured to receive a portion of the conveyor element 802, with a first end of the kiln 804 configured to receive the precursor materials via the conveyor element 802 and a second end of the kiln 804, opposite the first end, configured to output a product from the kiln 804. In examples, the kiln 804 may be positioned relative to the second section of the conveyor element 802. The kiln 804 may be configured to apply heat to the precursor material as it travels through the kiln 804. The system may also include one or more heat ducts 806, which may be configured to apply heat and/or to allow for heat to exit the kiln 804. In examples, the amount of heat applied by the kiln 804 to the precursor materials may be adjustable. For example, the temperature inside the kiln 804 may be between about 20 degrees Celsius and about 900 degrees Celsius for an example run time. In further examples, the kiln 804 may be configured to apply a heating gradient and/or differing temperatures to the precursor materials as they travel through the kiln 804. The temperature may vary depending on, for example, the speed at which the conveyor element 802 is moving and/or specifications for the mesoporous cellular magmatic desired as output from the kiln 804.

The one or more computing components may be utilized to control the operation of the various components of the system 800. For example, the computing components may include one or more processors 808, one or more network interfaces 810, and/or memory 812 storing instructions that, when executed, cause the one or more processors 808 to perform operations associated with the manufacture of mesoporous cellular magmatics. For example, the operations may include controlling the speed at which the conveyor element 802 moves, the volume of material that exits one or more of the hoppers, a time at which the hoppers are moved for filling of materials and/or for placement above the conveyor element 802, an amount of material added to the hoppers, a time at which the hoppers start and/or stop allowing materials to travel from the hoppers to the conveyor element 802, a temperature and/or temperature gradient at which to set the kiln 804, and/or when to enable and/or disable one or more components of the system 800. The computing components may include one or more input mechanisms such as a keyboard, mouse, touchscreen, etc. to allow a user of the system to physically provide input to the computing components to control the silicate aggregate manufacturing systems.

Additionally, or alternatively, the one or more network interfaces 810 may be configured to receive data from one or more other devices, such as mobile devices and/or remote servers and/or remote systems. In these examples, the received data may cause the system 800 to perform one or more of the operations described above such that a user need not be physically present at the system 800 to operate it. Additionally, the network interfaces 810 may be utilized to send data associated with the operations of the system 800 to the one or more other devices. By so doing, one or more remote operators and/or users may be enabled to observe operation of the system 800 without necessarily being physically present at the system 800. In these examples, the system 800 may include one or more sensors that may generate data indicating operational parameters of the system 800. For example, one or more temperature sensors, pressure sensors, motion sensors, and/or weight and/or volume sensors may be included in the system.

As used herein, a processor, such as processor 808, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 808 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 808 may possess its own local memory, which also may store program components, program data, and/or one or more operating systems.

The memory 812 may include volatile and nonvolatile memory, removable and non-removable media implemented in any method or technology for storage of information, such as computer-readable instructions, data structures, program component, or other data. Such memory 812 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 812 may be implemented as computer-readable storage media ("CRSM"), which may be any available physical media accessible by the processor(s) 808 to execute instructions stored on the memory 812. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 808.

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 812, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 810 may enable messages between the components and/or devices shown in system 800 and/or with one or more other remote systems, as well as other networked devices. Such network interface(s) 810 may include one or more network interface controllers (NICs) or other types of transceiver devices to send and receive messages over a network.

For instance, each of the network interface(s) 810 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 810 may include a wide area network (WAN) component to enable message over a wide area network.

While various examples and embodiments are described individually herein, the examples and embodiments may be combined, rearranged and modified to arrive at other variations within the scope of this disclosure.

Example Clauses

A: An article of manufacture, comprising: a rigid foam mass being composed of at least one silicate based component and having: a non-crystalline portion; and a crystalline portion that is bound to the non-crystalline portion, in line with the definition of glass ceramics; and a binder and/or mesoporous material disposed within and enclosed by pores of at least a portion of at least one of the non-crystalline portion or the crystalline portion.

B: The system of clause A, wherein the binder and/or mesoporous material is a product of a chemical reaction between the rigid foam mass and a solution.

C: The article of manufacture of clause A or B, wherein the solution includes at least one of sodium metasilicate, lignosulfate, epoxy, ceramic slurry, clay slurry, cementitious slurry, plaster, mortar, starch, sugar, syrup, molasses, acrylic paint, enamel paint, biochar, pyrolysis ash, activated carbon, carbon nano-powder, zeolite(s), aluminosilicate, propylcarboxylic acid functionalized silica, and/or silica nanoparticles.

D: The article of manufacture of clause A, wherein the rigid foam mass exhibits macroporous and mesoporous characteristics.

E: An article of manufacture, comprising: an engineered foam mass having: at least one of a non-crystalline portion or a crystalline portion bound to the non-crystalline portion; and a binder and/or mesoporous material disposed within pores of at least a portion of the at least one of the non-crystalline portion or the crystalline portion.

F: The article of manufacture of clause E, further comprising a vitreous material disposed within the pores of at least a portion of the at least one of the non-crystalline portion or the crystalline portion.

G: The article of manufacture of clause E, wherein the vitreous material includes at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, Sodium Nitrate, Sodium Sulphate, Sodium Silica-fluoride, Zinc Oxide.

H: The article of manufacture of clause E and/or G wherein the vitreous material is a reactive material configured to cause a chemical reaction with a substance when the substance contacts the reactive material.

I: The article of manufacture of clause E and/or G wherein the vitreous material includes a surface chemistry configured to bind at least partially with a wall of the pores such that the vitreous material is fused to the wall of the pores.

J: The article of manufacture of clause E and/or G wherein the vitreous material is a non-reactive material configured to avoid a chemical reaction with a substance when the substance contacts the non-reactive material but where the substance is involved in the chemical reaction with at least a portion of at least one of the non-crystalline portion or the crystalline portion.

K: The article of manufacture of clause E and/or G wherein the vitreous material includes a surface chemistry configured to resist incorporation of the vitreous material into a wall of the pores.

L: The article of manufacture of clause E and/or G further comprising a non-sintering mesoporous agent disposed within the pores of at least a portion of the at least one of the non-crystalline portion or the crystalline portion.

M: A method comprising: creating a mixture of: a pulverized or powdered glass; a pulverized or powdered blowing agent; a vitreous material having a melting temperature higher than the pulverized or powdered glass and the pulverized or powdered blowing agent; and a non-sintering mesoporous agent; applying heat to the mixture at a first temperature and for a first dwell time until: at least a portion of the mixture sinters; at least a portion of the pulverized or powdered glass foams to form a foamed mass; at least a portion of the pulverized or powdered blowing agent decomposes; and the vitreous material is enclosed by pores of the foamed mass; and applying a solution containing a binder and/or mesoporous material upon the foamed mass.

N: The method of clause M, wherein the vitreous material is a reactive material configured to cause a chemical reaction with a substance when the substance contacts the reactive material.

O: The method of clause M, wherein the non-sintering mesoporous agent is enclosed by the pores of the foamed mass.

P: The method of clause M, wherein the solution includes at least one of sodium metasilicate, lignosulfate, epoxy, ceramic slurry, clay slurry, cementitious slurry, plaster, mortar, starch, sugar, syrup, molasses, acrylic paint, enamel paint, biochar, pyrolysis ash, activated carbon, carbon nanopowder, zeolite(s), aluminosilicate, propylcarboxylic acid functionalized silica, and/or silica nanoparticle.

Q: The method of clause M, wherein the heat is applied until the vitreous material fuses to a wall of the pores.

R: The method of clause M, wherein the foamed mass includes a majoritively open cell structure.

S: The method of clause M, wherein the foamed mass includes a majoritively closed cell structure.

T: The method of clause M, further comprising applying heat to the mixture at a second temperature and for a second dwell time until the foamed mass has dried and comprises a foamed mass agglomerate.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter. Each claim of this document constitutes a separate embodiment, and embodiments that combine different claims and/or different embodiments are within the scope of the disclosure and will be apparent to those of ordinary skill in the art after reviewing this disclosure.

What is claimed is:

1. An article of manufacture, comprising:
   a rigid foam mass being composed of at least one silicate based component and having:
      a non-crystalline portion; and
      a crystalline portion that is bound to the non-crystalline portion, wherein at least a first portion of the rigid foam mass comprises glass ceramic; and
   a zeolite material disposed within and enclosed by pores of at least a second portion of at least one of the non-crystalline portion or the crystalline portion, wherein the rigid foam mass exhibits macroporous and mesoporous characteristics.

2. The article of manufacture of claim 1, wherein the zeolite material is a product of zeolite synthesis caused by a chemical reaction between the rigid foam mass and a solution.

3. The article of manufacture of claim 2, wherein the solution includes at least one of alkali aluminates, alkali/alkaline hydroxides, alkali carbonates, water glass, and/or tetramethylammonium hydroxide.

4. An article of manufacture, comprising:
   an engineered foam mass having:
      a non-crystalline portion and a crystalline portion bound to the non-crystalline portion;
      a zeolite material disposed within first pores of at least a first portion of at least one of the non-crystalline portion or the crystalline portion; and
      a vitreous material disposed within second pores of at least a second portion of at least one of the non-crystalline portion or the crystalline portion, the vitreous material comprising a different material then the engineered foam mass.

5. The article of manufacture of claim 4, further comprising a material disposed within third pores of at least a third portion of at least one of the non-crystalline portion or the crystalline portion, the material including at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, Sodium Nitrate, Sodium Sulphate, Sodium Silica-fluoride, Zinc Oxide.

6. The article of manufacture of claim 4, wherein the vitreous material is a reactive material.

7. The article of manufacture of claim 4, wherein the vitreous material includes a surface chemistry configured to bind at least partially with a wall of the second pores such that the vitreous material is fused to the wall of the second pores.

8. The article of manufacture of claim 4, wherein the vitreous material is a non-reactive material.

9. The article of manufacture of claim 4, wherein the vitreous material includes a surface chemistry configured to resist incorporation of the vitreous material into a wall of the second pores.

10. The article of manufacture of claim 4, wherein at least one of the non-crystalline portion or the crystalline portion includes vesicular corridors.

11. An article of manufacture, comprising:
    a rigid foam mass being composed of at least one silicate based component and having:
       a non-crystalline portion; and
       a crystalline portion that is bound to the non-crystalline portion;
    a zeolite material disposed within first pores of at least a first portion of at least one of the non-crystalline portion or the crystalline portion; and
    a vitreous material disposed within second pores of at least a second portion of at least one of the non-crystalline portion or the crystalline portion, the vitreous material comprising a different material then the rigid foam mass.

12. The article of manufacture of claim 11, wherein the zeolite material is a product of a chemical reaction between the rigid foam mass and a solution, the solution including at least one of alkali aluminates, alkali/alkaline hydroxides, alkali carbonates, water glass, and/or tetramethylammonium hydroxide.

13. The article of manufacture of claim 11, further comprising a material disposed within third pores of at least a third portion of at least one of the non-crystalline portion or the crystalline portion, the material including at least one of Alumina, Alumina Hydrate, Aplite, Feldspar, Nepheline Syenite, Calumite, Kyanite, Kaolin, Cryolite, Antimony Oxide, Arsenious Oxide, Barium Carbonate, Barium Oxide, Barium Sulfate, Boric Acid, Borax, Anhydrous Borax, Quicklime, Calcium Hydrate, Calcium Carbonate, Dolomitic Lime, Dolomite, Finishing Lime, Litharge, Minium, Calcium Phosphate, Bone ash, Iron Oxide, Caustic Potash, Saltpeter, Potassium Carbonate, Hydrated Potassium Carbonate, Sand, Diatomite, Soda Ash, Sodium Nitrate, Sodium Sulphate, Sodium Silica-fluoride, Zinc Oxide.

14. The article of manufacture of claim 11, wherein the vitreous material is a reactive material.

15. The article of manufacture of claim 11, wherein the vitreous material includes a surface chemistry configured to bind at least partially with a wall of the second pores such that the vitreous material is fused to the wall of the second pores.

16. The article of manufacture of claim 11, wherein the vitreous material is a non-reactive material.

17. The article of manufacture of claim 11, wherein the vitreous material includes a surface chemistry configured to resist incorporation of the vitreous material into a wall of the second pores.

18. The article of manufacture of claim 11, wherein at least one of the non-crystalline portion or the crystalline portion includes vesicular corridors.

19. The article of manufacture of claim 11, wherein the rigid foam mass exhibits macroporous and mesoporous characteristics.

20. The article of manufacture of claim 11, wherein the zeolite material is a product of zeolite synthesis caused by a chemical reaction between the rigid foam mass and a solution.

\* \* \* \* \*